United States Patent
Yang et al.

(10) Patent No.: US 12,231,212 B2
(45) Date of Patent: Feb. 18, 2025

(54) INFORMATION TRANSMISSION METHOD AND DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 337 days.

(21) Appl. No.: 17/724,290

(22) Filed: Apr. 19, 2022

(65) Prior Publication Data

US 2022/0255617 A1  Aug. 11, 2022

Related U.S. Application Data

(63) Continuation of application No. PCT/CN2020/126508, filed on Nov. 4, 2020.

(30) Foreign Application Priority Data

Nov. 7, 2019 (CN) .......................... 201911083647.4

(51) Int. Cl.
*H04B 7/08* (2006.01)
*H04L 27/26* (2006.01)
(Continued)

(52) U.S. Cl.
CPC ....... *H04B 7/088* (2013.01); *H04L 27/26025* (2021.01); *H04W 16/28* (2013.01); *H04W 76/19* (2018.02)

(58) Field of Classification Search
CPC ...... H04B 7/088; H04W 76/19; H04W 16/28; H04L 27/26025
See application file for complete search history.

(56) References Cited

U.S. PATENT DOCUMENTS

| 10,813,157 B1* | 10/2020 | Bai .................. H04W 72/1268 |
| 2019/0053294 A1 | 2/2019 | Xia et al. |
| 2019/0075599 A1 | 3/2019 | Xia et al. |
| 2019/0166645 A1* | 5/2019 | Sadiq .................. H04B 7/0617 |

(Continued)

FOREIGN PATENT DOCUMENTS

| CN | 108810933 A | 11/2018 |
| CN | 110012549 A | 7/2019 |

(Continued)

OTHER PUBLICATIONS

Written Opinion for Singapore Application No. 11202204337U, dated Aug. 14, 2023, 12 Pages.

(Continued)

*Primary Examiner* — Blake J Rubin
(74) *Attorney, Agent, or Firm* — BROOKS KUSHMAN P.C.

(57) ABSTRACT

Embodiments of this application provide an information transmission method and a device. The method includes: receiving a response message to a beam failure recovery request from a network device; determining, based on a first beam indicated in the beam failure recovery request, target beam information; and transmitting, within a first predetermined time period, first information by using the target beam information; where a start point of the predetermined time period is: a time at which UE receives the response message, or a time after a first duration following reception of the response message by the UE, and the first duration is associated with a target subcarrier spacing.

15 Claims, 4 Drawing Sheets

(51) Int. Cl.
*H04W 16/28* (2009.01)
*H04W 76/19* (2018.01)

(56) References Cited

U.S. PATENT DOCUMENTS

| | | | |
|---|---|---|---|
| 2019/0215712 A1 | 7/2019 | Babaei et al. | |
| 2019/0229777 A1 | 7/2019 | Guan et al. | |
| 2019/0253127 A1 | 8/2019 | Kang et al. | |
| 2019/0253949 A1 | 8/2019 | Park et al. | |
| 2019/0254064 A1 | 8/2019 | Islam et al. | |
| 2019/0305840 A1 | 10/2019 | Cirik et al. | |
| 2021/0022052 A1* | 1/2021 | Lee | G01S 13/931 |
| 2021/0029724 A1* | 1/2021 | Tsai | H04W 72/569 |
| 2021/0058805 A1* | 2/2021 | Ji | H04W 24/04 |
| 2021/0153284 A1* | 5/2021 | Zhou | H04L 41/0668 |
| 2022/0110181 A1* | 4/2022 | Miao | H04L 1/1822 |
| 2022/0271817 A1* | 8/2022 | Lee | H04B 17/336 |
| 2022/0394800 A1* | 12/2022 | Bai | H04W 72/23 |

FOREIGN PATENT DOCUMENTS

| | | |
|---|---|---|
| CN | 110022611 A | 7/2019 |
| WO | 2018199079 A1 | 11/2018 |
| WO | 2018223393 A1 | 12/2018 |
| WO | 2019032882 A1 | 2/2019 |
| WO | 2019191960 A1 | 10/2019 |

OTHER PUBLICATIONS $1^{st}$ Chinese Office Action, English Translation.
International Search Report and Written Opinion, English Translation.
CN108810933A, English Abstract and U.S. Equivalent U.S. Pub. No. 2019/0229777.
CN110012549A, English Abstract and Machine Translation.
CN110022611A, English Abstract and Machine Translation.
Extended European Search Report for Application No. 20883856.5-1206, dated Nov. 21, 2022, 12 Pages.
First Office Action for Chinese Application No. 201911083647.4 dated Jan. 17, 2022, 8 Pages.
International Search Report and Written Opinion for Application No. PCT/CN2020/126508, dated Jan. 21, 2021, 8 Pages.
Apple Inc., "Feature Lead Summary on SCell BFR and L1-SINR," 3GPP TSG-RAN WG1 #98bis, Agenda item 7.2.8.3, Oct. 14-20, 2019, R1-1911506, Chongqing, China, 33 Pages.
First Office Action for Japanese Application No. 2022-524259, dated Mar. 7, 3023, 7 Pages.
First Office Action for Korean Application No. 10-2022-7017604, dated Jul. 1, 2024, 7 Pages.
NTT Docomo, Inc. "Discussion on multi-beam enhancement" 3GPP TSG RAN WG1 #96, Athens, Greece, Feb. 2019, R1-1902813, 22 Pages.

\* cited by examiner

INFORMATION TRANSMISSION METHOD AND DEVICE

CROSS-REFERENCE TO RELATED APPLICATIONS

This application is a continuation application of PCT Application No. PCT/CN2020/126508 filed on Nov. 4, 2020, which claims priority to Chinese Patent Application No. 201911083647.4 filed on Nov. 7, 2019, the disclosures of which are incorporated herein by reference in their entireties.

TECHNICAL FIELD

This application relates to the field of communications technologies, and in particular, to an information transmission method and a device.

BACKGROUND

In a high band communications system, a wavelength of a radio signal is short, and therefore, communication is likely to be interrupted due to signal being blocked, user equipment (UE) movement, or the like. In this case, if radio link reestablishment in the conventional art is used, more time is consumed.

The problem is solved in the conventional art mainly by introducing a beam failure recovery (BFR) mechanism. Specifically, for a secondary cell (Scell) BFR mechanism, UE transmits a beam failure recovery request to a network device, and after receiving the beam failure recovery request, the network device transmits a response message to the beam failure recovery request to the UE.

However, there is no specification in the conventional art on when to use a new beam indicated in the beam failure recovery request to transmit an uplink/downlink channel or signal.

SUMMARY

According to a first aspect, an embodiment of this application provides an information transmission method, where the method includes: receiving a response message to a beam failure recovery request from a network device; determining, based on a first beam indicated in the beam failure recovery request, target beam information; and transmitting, within a first predetermined time period, first information by using the target beam information; where a start point of the first predetermined time period is: a time at which UE receives the response message, or a time after a first duration following reception of the response message by the UE; the first duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

According to a second aspect, an embodiment of this application provides an information transmission method, where the method includes: transmitting a response message to a beam failure recovery request to UE; determining, based on a first beam indicated in the beam failure recovery request, target beam information; and transmitting, within a second predetermined time period, first information by using the target beam information; where a start point of the second predetermined time period is: a time at which a network device transmits the response message, or a time after a second duration following transmission of the response message by the network device; the second duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

According to a third aspect, an embodiment of this application provides UE, including: a transmission module, configured to receive a response message to a beam failure recovery request from a network device; and a determining module, configured to determine, based on a first beam indicated in the beam failure recovery request, target beam information; where the transmission module is configured to transmit, within a first predetermined time period, first information by using the target beam information determined by the determining module; where a start point of the first predetermined time period is: a time at which UE receives the response message, or a time after a first duration following reception of the response message by the UE; the first duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

According to a fourth aspect, an embodiment of this application provides a network device, including: a transmission module, configured to transmit a response message to a beam failure recovery request to UE; and a determining module, configured to determine, based on a first beam indicated in the beam failure recovery request, target beam information; where the transmission module is configured to transmit, within a second predetermined time period, first information by using the target beam information determined by the determining module, where a start point of the second predetermined time period is: a time at which the network device transmits the response message, or a time after a second duration following transmission of the response message by the network device; the second duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

According to a fifth aspect, an embodiment of this application provides UE, including a processor, a memory, and a computer program stored in the memory and capable of running on the processor, where when the computer program is executed by the processor, the steps of the information transmission method according to the first aspect are implemented.

According to a sixth aspect, an embodiment of this application provides a network device, including a processor, a memory, and a computer program stored in the memory and capable of running on the processor, where when the computer program is executed by the processor, the steps of the information transmission method according to the second aspect are implemented.

According to a seventh aspect, an embodiment of this disclosure provides a computer-readable storage medium, where the computer-readable storage medium stores a computer program, and when the computer program is executed by a processor, the steps of the foregoing information transmission method are implemented.

DETAILED DESCRIPTION

Figure 1:
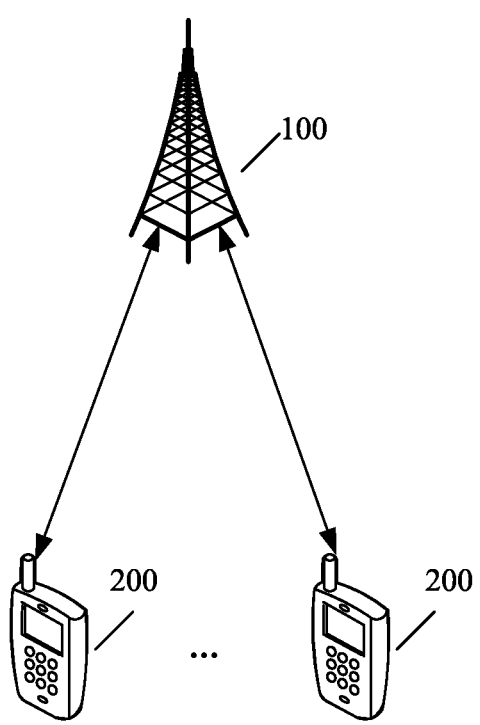
FIG. 1 is a possible schematic structural diagram of a communications system according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

For ease of understanding, the following describes some of the terms included in the embodiments of this application.
1. SCell BFR Mechanism The SCell BFR mechanism introduced in 3GPP Release 16 is mainly used for a multi-carrier scenario (which may be understood as carrier aggregation CA, where there are a plurality of carriers or a plurality of component carriers CC or a plurality of cells), where there are one primary cell (for example, a primary cell (PCell) in a master cell group (MCG), or a primary secondary cell (PSCell) in a secondary cell group (SCG)) and at least one Scell.

(1) Use scenario: a Scell with downlink and uplink; a Scell with downlink only; and a Pcell in frequency range 1 (FR1) or frequency range 2 (FR2).

(2) SCell BFD reference signal (RS):

Periodic 1-port channel state information (CSI) reference signal (CSI-RS);

A measurement result is based on a hypothetical block error rate (hypothetical BLER);

For an explicit configuration, a BFD RS is located on a current CC;

For an implicit configuration, a BFD RS may be located on an active bandwidth part (BWP) of a current CC or another CC;

A BLER threshold for SCell BFD is a default value of rlmInSyncOutOfSyncThreshold;

An R15 BFD procedure is reused, that is, the BFD is performed per SCell; and

Up to 2 BFD RSs for per BWP is supported without introducing additional UE capability.

(3) DL RS for new beam identification:

A DL RS for new beam identification may be based on an SSB and a CSI-RS for BM;

A DL RS for new beam identification may be transmitted on an active BWP, where the BWP belongs to a CC that is configured to monitor BFR, or is on another CC on a same band;

A new beam identification threshold is based on an L1-reference signal received power (L1-RSRP);

When the SCell BFR and the RS for new beam identification are configured, a threshold for new beam identification is always configured;

If one SCell fails, when no L1-RSRP of a new beam is higher than the configured threshold, for new beam information reporting, UE reports no new beam identified for the Scell;

The maximum number of RSs for new beam identification in each BWP is 64;

A range of threshold for SCell new beam identification is based on a range specified in RSRP-Range; and If the SCell BFR is configured, a new beam RS must be configured.

(4) Beam failure recovery request (BFRQ)

BFRQ transmission condition: If UE declares beam failure, the UE transmits a BFRQ to a network;

For SCell with DL only, the UE reports UE failed CC index(es) and new beam information (if present) by PUSCH or PUCCH. If a new candidate beam RS and a corresponding threshold are configured, and at least channel quality of the new beam is greater than or equal to the threshold, the UE reports new beam information during BFR. The UE reports a beam index of only one beam for one SCell.

A dedicated SR-like PUCCH resource on a PCell or PSCell is used to trigger a PUSCH for transmission of a BFRQ.

A PUCCH-BFR may be configured with PUCCH format 0 or PUCCH format 1.

When the PUCCH-BFR collides with an SRS, the SRS is dropped.

For eMBB, when the PUCCH-BFR collides with other PUCCHs (carrying no SR), dropping/multiplexing rules for collision handling between SRs and other PUCCHs in R15 is reused.

(5) Beam failure recovery response (BFRR)

A BFRR to step 2 MAC CE is used for a normal uplink grant to schedule a new transmission. The scheduled new transmission uses a same hybrid automatic repeat request (HARD) process as a physical uplink shared channel (PUSCH) carrying the step 2 MAC CE. The procedure is the same as normal "ACK" for PUSCH. When the UE received a BFRR to step 2, the UE may consider that the BFR procedure is finished.

A response to a PUCCH-BFR may be a cell radio network temporary identifier (Cell RNTI, C-RNTI)/modulation and coding scheme-cell radio network temporary identifier (Modulation and coding scheme-C-RNTI, MCS-C-RNTI) corresponding to a normal uplink grant.

2. In the conventional art, the SCell BFR mechanism has the following problems: after the UE received the BFRR, which beam is used for transmission of each downlink/uplink channel and signal, and when the determined beam is used for transmission the downlink/uplink channels and signals. To be specific, in the conventional art, a timing of using the new beam indicated in the BFRQ is not specified.

To resolve this problem, in the information transmission method, the UE, and the network device provided in the embodiments of this application, after receiving the BFRR from the network device, the UE may determine, based on the new beam indicated in the BFRQ, the target beam information, and transmit, within a predetermined time period, first information (a channel or a signal) by using the target beam information, where a start point of the predetermined time period is: a time at which the UE received the BFRR, or a time after a target duration following reception of the BFRR by the UE, and the target duration is associated with a target subcarrier spacing. In this way, a time period of using the new beam indicated in the BFRQ is defined, so that the network device and the UE can have a consistent understanding of the beam information of channels or signals, thereby ensuring correct transmission of the channels or signals.

3. Other Terms

It should be noted that "/" in this specification represents or, for example, A/B may represent A or B; and that the term "and/or" in this specification describes only an association relationship for describing associated objects and represents that three relationships may exist, for example, A and/or B may represent the following three cases: Only A exists, both A and B exist, and only B exists.

It should be noted that, for ease of clear description of the technical solutions of the embodiments of this application, in the embodiments of this application, the words "first," "second", and the like are used to distinguish the same items or similar items having substantially the same functions or roles, and those skilled in the art can understand that the words "first," "second", and the like do not constitute any limitation on a quantity and an execution order. For example, a first carrier and a second carrier are used to distinguish different carriers, but not to describe a specific order of the carriers.

It should be noted that, in the embodiments of this application, words such as "an example" or "for example" are used to represent an example, an instance, or an illustration. Any embodiment or design scheme described as "an example" or "for example" in the embodiments of this application should not be construed as being more preferred or advantageous than other embodiments or design schemes. Specifically, the terms such as "an example" or "for example" are used to present related concepts in a specific manner.

It should be noted that, in this embodiment of this application, "of", "corresponding or relevant", and "corresponding" may be interchangeably used sometimes. It should be noted that expressed meanings are consistent when differences are not emphasized. In the embodiments of this application, "a plurality of" means at least two.

The following describes the technical solutions provided in this application with reference to the accompanying drawings.

The technical solutions provided in this application can be applied to various communications systems, such as a 5G communications system, a future evolved system, or a plurality of communication fusion systems. A plurality of application scenarios may be included, such as machine to machine (M2M), D2M, macro-micro communications, enhanced mobile Internet (enhance Mobile Broadband, eMBB), ultra reliable and low latency communications (uRLLC), and massive machine type communications (mMTC). These scenarios include, but are not limited to, scenarios such as communication between terminal devices, communication between network devices, or communication between a network device and a terminal device. The embodiments of this application can be applied to communication between a network device and a terminal device, or communication between terminal devices, or communication between network devices in a 5G communications system.

FIG. 1 is a possible schematic structural diagram of a communications system related in an embodiment of this application. As shown in FIG. 1, the communications system includes at least one network device 100 (only one is shown in FIG. 1) and one or more UEs 200 connected to each network device 100.

The network device 100 may be a base station, a core network device, a transmission and reception point (TRP), a relay station, an access point, or the like. The network device 100 may be a base transceiver station (BTS) in a global system for mobile communications (GSM) or code division multiple access (CDMA) network, may be an NB (NodeB) in wideband code division multiple access (WCDMA), or may be an eNB or eNodeB (evolved NodeB) in LTE. The network device 100 may alternatively be a wireless controller in a cloud radio access network (CRAN) scenario. The network device 100 may alternatively be a network device in a 5G communications system or a network device in a future evolved network. However, the use of words does not constitute any limitation on this application.

The UE 200 may be a terminal device, and the terminal device may be a wireless terminal device or a wired terminal device. The wireless terminal device may be a device that provides voice and/or other service data connectivity to a user, a handheld device having a wireless communication function, a computing device or other processing devices connected to a wireless modem, an in-vehicle device, a wearable device, a terminal device in a future 5G network, a terminal device in a future evolved PLMN network, or the like. The wireless terminal device may communicate with one or more core networks through a radio access network (RAN). The wireless terminal device may be a mobile terminal device, such as a mobile phone (also referred to as a "cellular" phone) and a computer provided with a mobile terminal device, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal device may also be a mobile device, a UE terminal device, an access terminal device, a wireless communications device, a terminal device unit, a terminal device station, a mobile station, a mobile, a remote station, a remote terminal unit, a remote terminal, a subscriber unit, a subscriber station, a user agent, a terminal device apparatus, or the like. In an example, in this embodiment of this application, FIG. 1 shows a mobile phone as an example of a terminal device.

Figure 2:
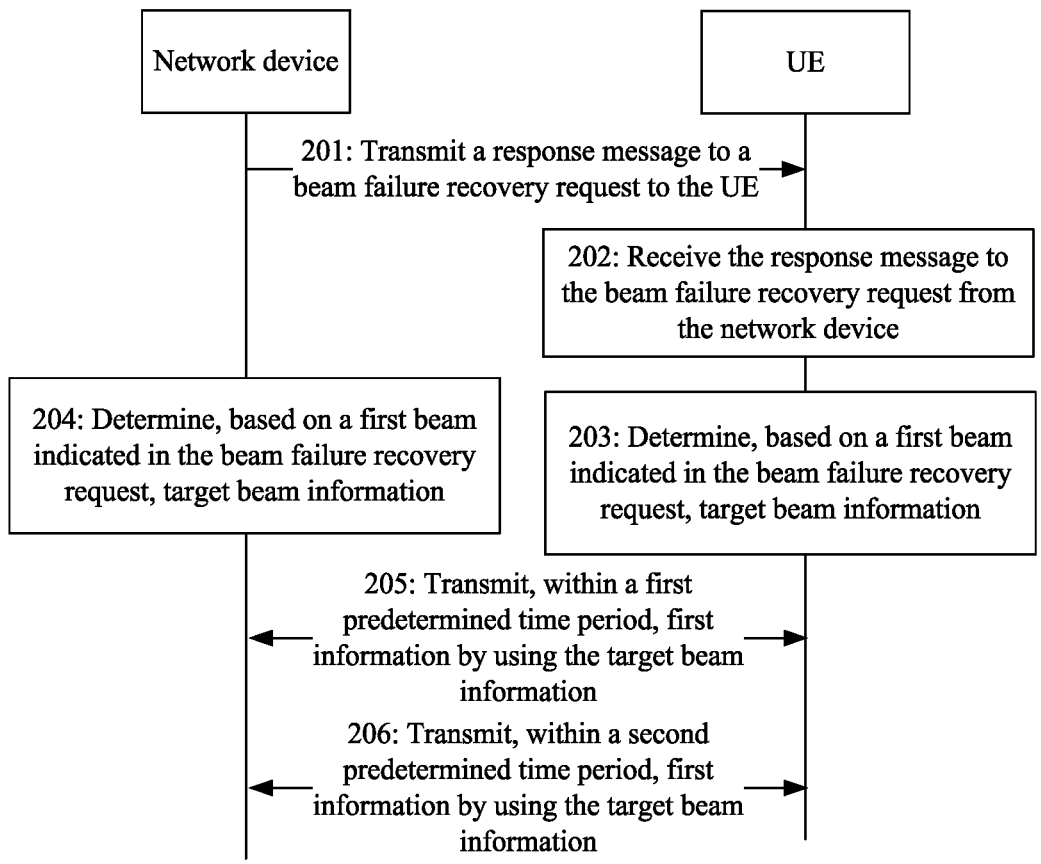
FIG. 2 is a schematic flowchart of an information transmission method according to an embodiment of this application.

FIG. 2 shows a schematic flowchart of an information transmission method according to an embodiment of this application. As shown in FIG. 2, the information transmission method may include following step 201 to step 206.

Step 201: A network device transmits a response message to a beam failure recovery request to UE.

The beam failure recovery request in this embodiment of this application may be a BFRQ, and the response message to the beam failure recovery request in this embodiment of this application may be a BFRR.

Step 202: The UE receives the response message to the beam failure recovery request from the network device.

Step 203: The UE determines, based on a first beam indicated in the beam failure recovery request, target beam information.

Step 204: The network device determines, based on a first beam indicated in the beam failure recovery request, target beam information.

It should be noted that there is no definite sequence between the foregoing step 203 and step 204. For example, step 203 may be performed before step 204, or step 204 may be performed before step 203, or step 203 and step 204 may be simultaneously performed. This is not limited in this embodiment of this application.

Step 205: The UE transmits, within a first predetermined time period, first information by using the target beam information.

In this embodiment of this application, a start point of the first predetermined time period is: a time at which the UE receives the response message to the beam failure recovery request, or a time after a first duration following reception of the response message to the beam failure recovery request by the UE. The first duration is associated with a target subcarrier spacing. The target subcarrier spacing includes: a first subcarrier spacing corresponding to a first carrier on which the response message to the beam failure recovery request is located, and/or a second subcarrier spacing corresponding to a second carrier on which the first information is located.

Optionally, in this embodiment of this application, an end point of the first predetermined time period is: a time at which the UE receives second information configured or reconfigured by the network device by using radio resource control RRC signaling, or a time at which the UE receives second information activated by the network device by using a MAC CE command, or a time at which the UE receives second information indicated by the network device by using downlink control information DCI signaling, or a time after the UE transmits feedback information of second information to the network device; where the second information is transmission configuration indicator (TCI) state information or spatial relation information of the first information.

Optionally, in this embodiment of this application, the solution provided in the foregoing embodiment of this application further includes the following step A1 or step A2 or step A3.

Step A1: The UE determines, based on the first subcarrier spacing, the first duration.

Step A2: The UE determines, based on the second subcarrier spacing, the first duration.

Step A3: The UE determines, based on a third subcarrier spacing, the first duration.

The third subcarrier spacing is the larger one of the first subcarrier spacing and the second subcarrier spacing, or the third subcarrier spacing is the smaller one of the first subcarrier spacing and the second subcarrier spacing.

Further, optionally in this embodiment of this application, the step A1 may include the following: in a case that the first carrier is on an FR2 band and that the second carrier is on an FR1 band, determining, by the UE based on the first subcarrier spacing, the first duration; or in a case that both the first carrier and the second carrier are on the FR2 band, determining, by the UE based on the first subcarrier spacing, the first duration.

Further, optionally in this embodiment of this application, the step A2 may include the following: in a case that the first carrier is on an FR1 band and that the second carrier is on an FR2 band, determining, by the UE based on the second subcarrier spacing, the first duration; or in a case that both the first carrier and the second carrier are on the FR2 band, determining, by the UE based on the second subcarrier spacing, the first duration.

For example, when the first carrier is on the FR1 band and the second carrier is on the FR2 band, the UE determines, based on the second subcarrier spacing corresponding to the second carrier, the first duration; or when the first carrier and the second carrier are different carriers on the FR2 band, the UE determines, based on the second subcarrier spacing or the first subcarrier spacing, the first duration, where the first carrier and the second carrier may be on different bands or a same band in FR2; or when both the first carrier and the second carrier are same carriers on a same FR2 band, the UE may select any one of the first subcarrier spacing and the second subcarrier spacing to determine the first duration.

Step 206: The network device transmits, within a second predetermined time period, first information by using the target beam information.

In this embodiment of this application, the first information includes a channel or a signal.

In this embodiment this application, the first information may be uplink information, or may be downlink information.

In this embodiment of this application, an execution sequence of the step 205 and the step 206 is determined by the first information.

In an example, if the first information is downlink information, the step 206 is transmitting the downlink information by the network device using the target beam information within the second predetermined time period, and correspondingly, the step 205 is receiving the downlink information by the UE using the target beam information within the first predetermined time period. If the first information is uplink information, the step 205 is transmitting the uplink information by the UE using the target beam information within the first predetermined time period, and correspondingly, the step 206 is receiving the uplink information by the network device using the target beam information within the second predetermined time period.

Optionally, in this embodiment of this application, the first information includes at least one of the following: a PDCCH on a CORESET, a physical downlink shared channel (PDSCH), a physical uplink control channel (PUCCH) or a physical uplink shared channel (PUSCH), a CSI-RS, and a sounding reference signal (SRS).

Further, optionally, the CSI-RS is used for beam failure detection or CSI measurement; or a higher-layer parameter usage of a resource set to which an SRS resource of the SRS belongs is set to codebook or non codebook or antenna switching. In an example, the CSI-RS is limited to: a CSI-RS that uses a CSI-RS resource for beam failure detection, and/or a CSI-RS that uses a CSI-RS resource for CSI acquisition. In another example, the CSI-RS may not include a CSI-RS for beam management. In another example, the CSI-RS may refer to CSI-RSs used for various purposes. In an example, the SRS is limited to: SRS resources in an SRS resource set used for codebook, nonCodebook, antennaSwitching. In another example, the SRS may refer to SRSs used for various purposes.

Optionally, in this embodiment of this application, a cell where the first information is transmitted includes at least one of the following: a secondary cell with a beam failure; all cells in a cell group to which a secondary cell with a beam failure belongs; and all cells in a band in which a secondary cell with a beam failure is located.

In this embodiment of this application, a start point of the second predetermined time period is: a time at which the network device transmits a response message to a beam failure recovery request, or a time after a second duration following transmission of the response message to the beam failure recovery request by the network device; and the second duration is associated with a target subcarrier spacing; where the target subcarrier spacing includes: a subcarrier spacing corresponding to a first carrier on which the response message to the beam failure recovery request is located, and/or a subcarrier spacing corresponding to a second carrier on which the first information is located.

Optionally, in this embodiment of this application, an end point of the second predetermined time period is: a time at which the network device transmits RRC signaling for configuring or reconfiguring second information, or a time at which the network device transmits a MAC CE command for activating second information, or a time at which the network device transmits downlink control information (DCI) signaling for indicating second information, or a time after the network device receives feedback information of second information transmitted by the UE; where the second information is TCI state information or spatial relation information of the first information.

For example, for the first information, a source RS (or known as reference RS) in the spatial relation information of the first information is a DL RS in beam information of a first beam indicated by the UE in BFRQ information (for example, MAC CE).

Optionally, in this embodiment of this application, the solution provided in the foregoing embodiment of this application further includes the following step B1 or step B2 or step B3.

Step B1: The network device determines, based on the first subcarrier spacing, the second duration.

Step B2: The network device determines, based on the second subcarrier spacing, the second duration.

Step B3: The network device determines, based on a third subcarrier spacing, the second duration.

The third subcarrier spacing is the larger one of the first subcarrier spacing and the second subcarrier spacing, or the third subcarrier spacing is the smaller one of the first subcarrier spacing and the second subcarrier spacing.

Further, optionally in this embodiment of this application, the step B1 may include the following: in a case that the first carrier is on an FR2 band and that the second carrier is on an FR1 band, determining, by the network device based on the first subcarrier spacing, the second duration; or in a case that both the first carrier and the second carrier are on the FR2 band, determining, by the network device based on the first subcarrier spacing, the second duration.

Further, optionally in this embodiment of this application, the step B2 may include the following: in a case that the first carrier is on an FR1 band and that the second carrier is on an FR2 band, determining, by the network device based on the second subcarrier spacing, the second duration; or in a case that both the first carrier and the second carrier are on the FR2 band, determining, by the network device based on the second subcarrier spacing, the second duration.

For example, when the first carrier is on the FR1 band and the second carrier is on the FR2 band, the network device determines, based on the second subcarrier spacing corresponding to the second carrier, the second duration; or when the first carrier and the second carrier are different carriers on the FR2 band, the network device determines, based on the second subcarrier spacing or the first subcarrier spacing, the second duration, where the first carrier and the second carrier may be on different bands or a same band in FR2; or when both the first carrier and the second carrier are same carriers on a same FR2 band, the network device may select any one of the first carrier spacing and the second subcarrier spacing to determine second duration.

Optionally, in this embodiment of this application, when receiving the response message to the beam failure recovery request, the UE may determine, based on the cell where the response message to the beam failure recovery request is transmitted, a beam that transmits the response message.

For example, the step 202 may include the following step 202*a* or step 202*b*.

Step 202*a*: In a case that a first cell is on an FR2 band and that the first cell is a cell other than a secondary cell with a beam failure, the UE determines, based on transmission configuration indicator TCI state information of a downlink channel in which the response message to the beam failure recovery request is located, a second beam, and uses the second beam to receive the response message to the beam failure recovery request from the network device.

Step 202*b*: In a case that a first cell is a secondary cell with a beam failure, the UE receives the response message to the beam failure recovery request from the network device.

The TCI state information of the downlink channel in which the response message to the beam failure recovery request is located includes beam information of the second beam. The first cell is a cell where the response message to the beam failure recovery request is transmitted.

For example, when the first cell is on an FR1 band, the UE does not need to determine the TCI state information of the downlink channel in which the response message is located.

Optionally, in this embodiment of this application, when transmitting the response message to the beam failure recovery request, the network device may determine, based on the cell where the response message to the beam failure recovery request is transmitted, a beam that transmits the response message.

For example, the step 203 may include the following step 203*a* or step 203*b*.

Step 203*a*: In a case that the first cell is on an FR2 band and that the first cell is a cell other than a secondary cell with a beam failure, the network device determines, based on TCI state information of a downlink channel in which the response message to the beam failure recovery request is located, a second beam, and uses the second beam to transmit the response message to the beam failure recovery request to the UE.

Step 203*b*: In a case that the first cell is a secondary cell with a beam failure, the network device uses the first beam to transmit the response message to the beam failure recovery request to the UE.

The TCI state information of the downlink channel in which the response message to the beam failure recovery request is located includes beam information of the second beam. The first cell is a cell where the response message to the beam failure recovery request is transmitted.

For example, when the first cell is on an FR1 band, the network device does not need to determine the TCI state information of the downlink channel in which the response message is located.

In the information transmission method provided in this embodiment of this application, after receiving a response message to a beam failure recovery request from the network device, the UE may determine, based on a first beam indicated in the beam failure recovery request, target beam information, and transmit, within a first predetermined time period, first information by using the target beam information. And after transmitting the response message to the beam failure recovery request to the UE, the network device may determine, based on the first beam indicated in the beam failure recovery request, the target beam information, and transmit, within a second predetermined time period, the first information by using the target beam information. In this way, a time period (that is, the first predetermined time period and the second predetermined time period) of using the beam indicated in the beam failure recovery request is defined, so that the network device and the UE can have a consistent understanding of the beam information of channels or signals, thereby ensuring correct transmission of the channels or signals.

Figure 3:
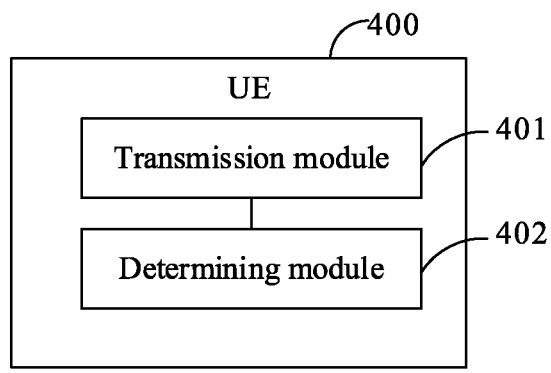
FIG. 3 is a schematic structural diagram of UE according to an embodiment of this application.

FIG. 3 is a schematic structural diagram of UE according to an embodiment of this application. As shown in FIG. 3, the UE 400 includes: a transmission module 401 and a determining module 402, where the transmission module 401 is configured to receive a response message to a beam failure recovery request from a network device; the determining module 402 is configured to determine, based on a first beam indicated in the beam failure recovery request, target beam information; and the transmission module 401 is configured to transmit, within a first predetermined time period, first information by using the target beam information determined by the determining module 402; where a start point of the first predetermined time period is: a time at which the UE receives the response message, or a time after a first duration following reception of the response message by the UE; the first duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

Optionally, the determining module 402 is further configured to: in a case that the first cell is on an FR2 band and that the first cell is a cell other than a secondary cell with a beam failure, based on TCI state information of a downlink channel in which the response message to the beam failure recovery request is located, determine a second beam, and the transmission module 401 is further configured to use the second beam determined by the determining module 402 to receive the response message from the network device; or the transmission module 401 is further configured to: in a case that a first cell is a secondary cell with a beam failure, use the first beam to receive the response message from the network device; where the first cell is a cell where the response message is transmitted.

Optionally, the determining module 402 is configured to: determine, based on the first subcarrier spacing, a first duration; or determine, based on the second subcarrier spacing, a first duration; or determine, based on a third subcarrier spacing, a first duration; where the third subcarrier spacing is a larger one of the first subcarrier spacing and the second subcarrier spacing, or the third subcarrier spacing is the smaller one of the first subcarrier spacing and the second subcarrier spacing.

Optionally, the determining module 402 is specifically configured to: in a case that the first carrier is on an FR2 band and that the second carrier is on an FR1 band, based on the first subcarrier spacing, determine the first duration; or in a case that both the first carrier and the second carrier are on the FR2 band, based on the first subcarrier spacing, determine the first duration; and the determining module 402 is specifically configured to: in a case that the first carrier is on an FR1 band and that the second carrier is on an FR2 band, based on the second subcarrier spacing, determine the first duration; or in a case that both the first carrier and the second carrier are on the FR2 band, based on the second subcarrier spacing, determine the first duration.

Optionally, an end point of the first predetermined time period is: a time at which the UE 400 received second information configured or reconfigured by the network device using RRC signaling, or a time at which the UE 400 received second information activated by the network device using a MAC CE command, or a time at which the UE 400 received second information indicated by the network device using DCI signaling, or a time after the UE 400 transmits feedback information of the second information to the network device; where the second information is TCI state information or spatial relation information of the first information.

Optionally, the first information includes at least one of the following: a PDCCH on a CORESET, a PDSCH, a PUCCH, a PUSCH, a CSI-RS, and an SRS.

Optionally, the CSI-RS is used for beam failure detection or CSI measurement; or a higher-layer parameter usage of a resource set to which an SRS resource of the SRS belongs is set to codebook or non codebook or antenna switching.

Optionally, a cell where the first information is transmitted includes at least one of the following: a secondary cell with a beam failure; all cells in a cell group to which a secondary cell with a beam failure belongs; and all cells in a band in which a secondary cell with a beam failure is located.

The UE provided in this embodiment of this application can implement the processes shown in the foregoing method. To avoid repetition, details are not described herein again.

After receiving the response message to the beam failure recovery request from the network device, the UE provided in this embodiment of this application may determine, based on the first beam indicated in the beam failure recovery request, the target beam information, and transmit, within a first predetermined time period, first information by using the target beam information. In this way, a time period (that is, the first predetermined time period) of using the beam indicated in the beam failure recovery request is defined, so that the network device and the UE can have a consistent understanding of the beam information of channels or signals, thereby ensuring correct transmission of the channels or signals.

Figure 4:
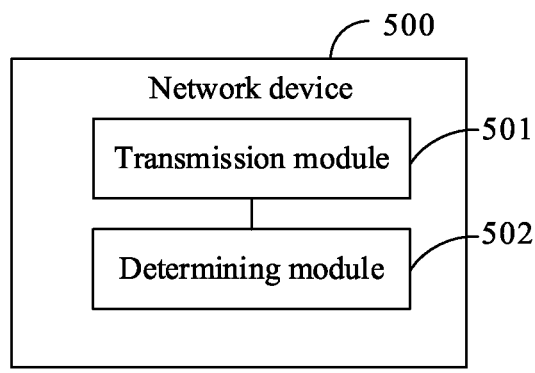
FIG. 4 is a first schematic structural diagram of a network device according to an embodiment of this application.

FIG. 4 is a schematic structural diagram of a network device according to an embodiment of this application. As shown in FIG. 4, the network device 500 includes: a transmission module 501 and a determining module 502, where the transmission module 501 is configured to transmit a response message to a beam failure recovery request to UE; the determining module 502 is configured to determine, based on a first beam indicated in the beam failure recovery request, target beam information; and the transmission module 501 is configured to transmit, within a second predetermined time period, first information by using the target beam information determined by the determining module 502; where a start point of the second predetermined time period is: a time at which the network device 500 transmits the response message, or a time after a second duration following transmission of the response message by the network device 500; the second duration is associated with a target subcarrier spacing; and the target subcarrier spacing includes: a subcarrier spacing corresponding to a first carrier on which the response message is located, and/or a subcarrier spacing corresponding to a second carrier on which the first information is located.

Optionally, the transmission module 501 is further configured to: in a case that the first cell is on an FR2 band and that the first cell is a cell other than a secondary cell with a beam failure, based on TCI state information of a downlink channel in which the response message to the beam failure recovery request is located, determine a second beam, and use the second beam to transmit the response message to the UE; or in a case that a first cell is a secondary cell with a beam failure, use the first beam to transmit the response message to the UE; wherein the first cell is a cell where the response message is transmitted.

Optionally, the determining module 502 is configured to: determine, based on the first subcarrier spacing, the second duration; or determine, based on the second subcarrier spacing, the second duration; or determine, based on a third subcarrier spacing, a second duration; where the third subcarrier spacing is a larger one of the first subcarrier spacing and the second subcarrier spacing, or the third subcarrier spacing is the smaller one of the first subcarrier spacing and the second subcarrier spacing.

Optionally, the determining module 502 is specifically configured to: in a case that the first carrier is on an FR2 band and that the second carrier is on an FR1 band, based on the first subcarrier spacing, determine the second duration; or in a case that both the first carrier and the second carrier are on the FR2 band, based on the first subcarrier spacing, determine the second duration; and in a case that the first carrier is on an FR1 band and that the second carrier is on an FR2 band, based on the second subcarrier spacing, determine the second duration; or in a case that both the first carrier and the second carrier are on the FR2 band, based on the second subcarrier spacing, determine the second duration.

Optionally, an end point of the second predetermined time period is: a time at which the network device 500 transmits RRC signaling for configuring or reconfiguring second information, or a time at which the network device 500 transmits a MAC CE command for activating second information, or a time at which the network device 500 transmits DCI signaling for indicating second information, or a time after the network device 500 received feedback information of the second information transmitted by the UE; where the second information is TCI state information or spatial relation information of the first information.

Optionally, the first information includes at least one of the following: a PDCCH on a CORESET, a PDSCH, a PUCCH, a PUSCH, a CSI-RS, and an SRS.

Optionally, the CSI-RS is used for beam failure detection or CSI measurement; or a higher-layer parameter usage of a resource set to which an SRS resource of the SRS belongs is set to codebook or non codebook or antenna switching.

Optionally, a cell where the first information is transmitted includes at least one of the following: a secondary cell with a beam failure; all cells in a cell group to which a secondary cell with a beam failure belongs; and all cells in a band in which a secondary cell with a beam failure is located.

The network device provided in this embodiment of this application can implement the processes shown in the foregoing method. To avoid repetition, details are not described herein again.

After transmitting the response message to the beam failure recovery request to the UE, the network device provided in this embodiment of this application may determine, based on the first beam indicated in the beam failure recovery request, the target beam information, and transmit, within a second predetermined time period, the first information by using the target beam information. In this way, a time period (that is, the second predetermined time period) of using the beam indicated in the beam failure recovery request is defined, so that the network device and the UE can have a consistent understanding of the beam information of channels or signals, thereby ensuring correct transmission of the channels or signals.

Figure 5:
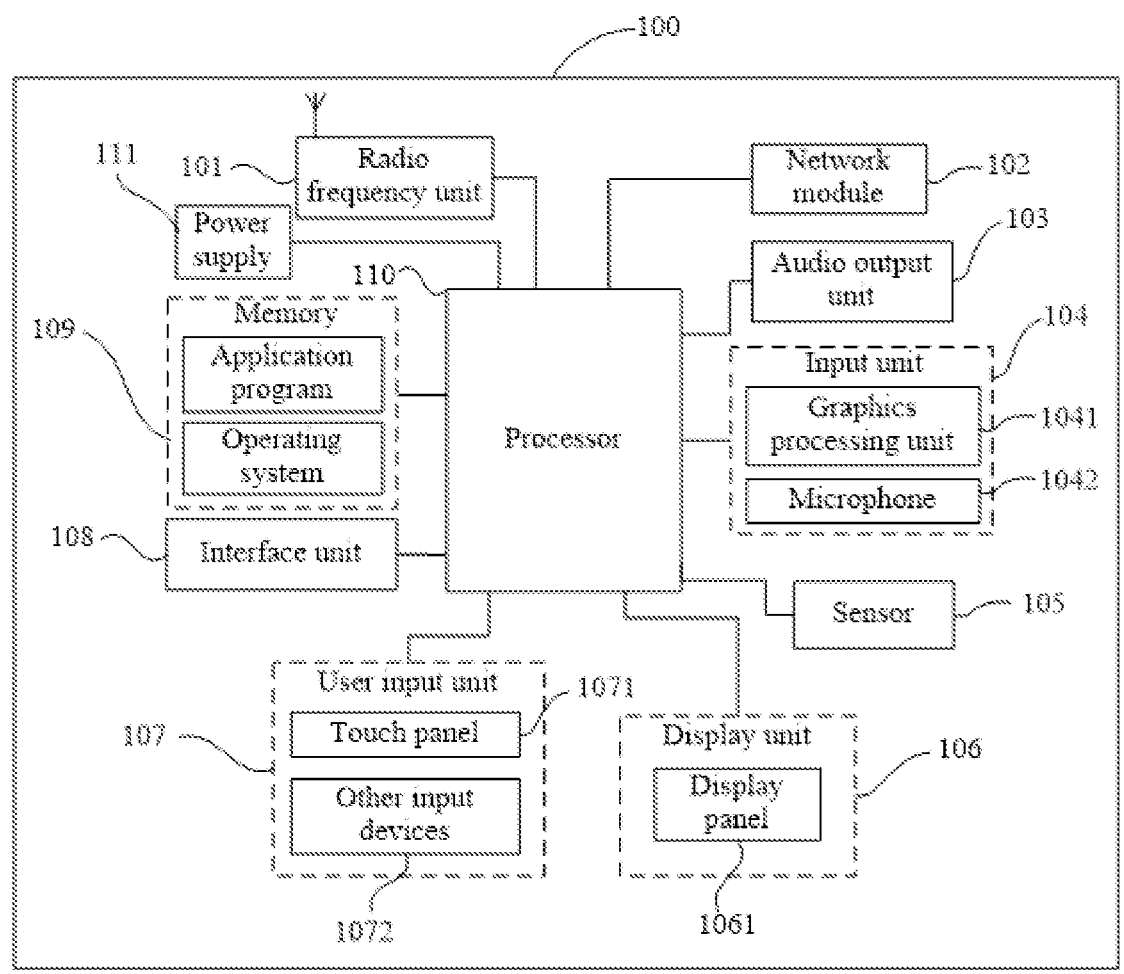
FIG. 5 is a schematic structural diagram of a terminal device according to an embodiment of this application.

With UE as an example of a terminal device, FIG. 5 is a schematic diagram of a hardware structure of a terminal device for implementing the embodiments of this application. The terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that the structure of the terminal device 100 shown in FIG. 5 does not constitute any limitation on the terminal device. The terminal device 100 may include more or fewer components than those shown in the figure, or combine some components, or arrange the components differently. In this embodiment of this application, the terminal device 100 includes but is not limited to a mobile phone, a tablet computer, a laptop computer, a palmtop computer, an in-vehicle terminal device, a wearable device, a pedometer, and the like.

The radio frequency unit 101 is configured to receive a response message to a beam failure recovery request from a network device; the processor 110 is configured to determine, based on a first beam indicated in the beam failure recovery request, target beam information; and the radio frequency unit 101 is configured to transmit, within a first predetermined time period, first information by using the target beam information determined by the processor 110; where a start point of the first predetermined time period is: a time at which the UE receives the response message, or a time after a first duration following reception of the response message by the UE; the first duration is associated with a target subcarrier spacing; and the target subcarrier spacing includes: a first subcarrier spacing corresponding to a first carrier on which the response message is located, and/or a second subcarrier spacing corresponding to a second carrier on which the first information is located.

After receiving the response message to the beam failure recovery request from the network device, the terminal device provided in this embodiment of this application may determine, based on the first beam indicated in the beam failure recovery request, the target beam information, and transmit, within the first predetermined time period, first information by using the target beam information. In this way, a time period (that is, the first predetermined time period) of using the beam indicated in the beam failure recovery request is defined, so that the network device and the terminal device can have a consistent understanding of the beam information of channels or signals, thereby ensuring correct transmission of the channels or signals.

It should be understood that, in this embodiment of this application, the radio frequency unit 101 may be configured to transmit or receive a signal in an information transmitting/receiving or call process. Specifically, the radio frequency unit 101 receives downlink data from a base station and transmits the downlink data to the processor 110 for processing; and transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices via a wireless communications system.

The terminal device 100 provides a user with wireless broadband internet access through the network module 102, for example, helping the user to send or receive an email, to browse a web page, or to access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received sound or a message received sound) related to a specific function performed by the terminal device 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or transmitted by using the radio frequency unit 101 or the network module 102. The microphone 1042 is capable of receiving sounds and processing such sounds into audio data. The processed audio data can be converted into a format output that can be transmitted to a mobile communication base station through the radio frequency unit 101 in a telephone call mode.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a type of motion sensor, an accelerometer sensor may detect magnitudes of accelerations in all directions (usually three axes), may detect a magnitude and a direction of gravity when the terminal device is in a static state, and may be applied to posture recognition of the terminal device (for example, landscape/portrait mode switching, a related games, or magnetometer posture calibration), functions related to vibration recognition (for example, a pedometer or tapping), or the like. The sensor 105 may further include a fingerprint sensor, a pressure sensor, an iris sensor, a molecular sensor, a gyroscope, a barometer, a hygrometer, a thermometer, or an infrared sensor. Details are not described herein.

The display unit 106 is configured to display information input by the user or information provided to the user. The display unit 106 may include the display panel 1061. The display panel 1061 may be configured in a form of a liquid crystal display (LCD), an organic light-emitting diode (OLED), or the like.

The user input unit 107 may be configured to receive entered numerical or character information, and generate key signal input that is related to user setting and function control of the terminal device 100. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using a finger or any appropriate object or accessory such as a stylus). The touch panel 1071 may include two parts: a touch detection apparatus and a touch controller. The touch detection apparatus detects a touch orientation of the user, detects a signal brought by the touch operation, and transmits the signal to the touch controller.

The touch controller receives touch information from the touch detection apparatus, converts the touch information into contact coordinates, transmits the contact coordinates to the processor 110, receives a command transmitted by the processor 110, and executes the command. In addition, the touch panel 1071 may be implemented in a plurality of forms, for example, as a resistive, capacitive, infrared, or surface acoustic wave touch panel. In addition to the touch panel 1071, the user input unit 107 may further include other input devices 1072. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 5, the touch panel 1071 and the display panel 1061 serve as two separate components to implement input and output functions of the terminal device 100. However, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal device 100, or may be configured to transmit data between the terminal device 100 and the external apparatus.

The memory 109 may be configured to store software programs and various data. The memory 109 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 109 may include a high-speed random access memory, and may further include a non-volatile memory such as a disk storage device, a flash memory device, or another volatile solid-state storage device.

The processor 110 is a control center of the terminal device 100, uses various interfaces and lines to connect all parts of the entire terminal device 100, and performs various functions and data processing of the terminal device 100 by running or executing the software program and/or module stored in the memory 109 and invoking data stored in the memory 109, thereby performing overall monitoring on the terminal device 100. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that the modem processor may alternatively be not integrated in the processor 110.

The terminal device 100 may further include a power supply 111 (for example, a battery) that supplies power to the components. Optionally, the power supply 111 may be logically connected to the processor 110 by using a power management system, so as to implement functions such as charging management, discharging management, and power consumption management by using the power management system.

In addition, the terminal device 100 includes some functional modules that are not illustrated. Details are not described herein.

Figure 6:
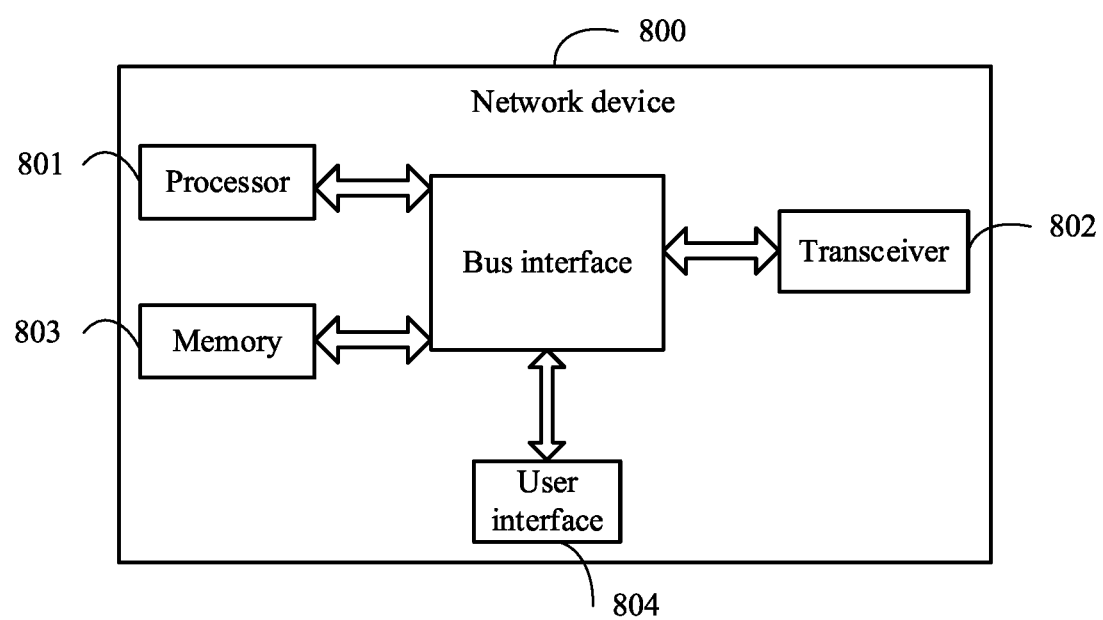
FIG. 6 is a second schematic structural diagram of a network device according to an embodiment of this application.

FIG. 6 is a schematic diagram of a hardware structure of a network device for implementing an embodiment of this application. The network device 800 includes a processor 801, a transceiver 802, a memory 803, a user interface 804, and a bus interface.

The transceiver 802 is configured to transmit a response message to a beam failure recovery request to UE; the processor 801 is configured to determine, based on a first beam indicated in the beam failure recovery request, target beam information; and the transceiver 802 is configured to transmit, within a second predetermined time period, first information by using the target beam information determined by the processor 801; where a start point of the second predetermined time period is: a time at which the network device transmits the response message, or a time after a second duration following transmission of the response message by the network device; the second duration is associated with a target subcarrier spacing; and the target subcarrier spacing includes: a subcarrier spacing corresponding to a first carrier on which the response message is located, and/or a subcarrier spacing corresponding to a second carrier on which the first information is located.

After transmitting the response message to the beam failure recovery request to the UE, the network device provided in this embodiment of this application may determine, based on the first beam indicated in the beam failure recovery request, the target beam information, and transmit, within a second predetermined time period, the first information by using the target beam information. In this way, a time period (that is, the second predetermined time period) of using the beam indicated in the beam failure recovery request is defined, so that the network device and the UE can have a consistent understanding of the beam information of channels or signals, thereby ensuring correct transmission of the channels or signals.

In this embodiment of this application, in FIG. 6, a bus architecture may include any quantity of interconnected buses and bridges, and specifically connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different user equipment, the user interface 804 may also be an interface capable of externally or internally connecting a required device, and the connected device includes but is not limited to a keypad, a display, a speaker, a microphone, a joystick, and the like. The processor 801 is responsible for management of the bus architecture and general processing, and the memory 803 may store data for use by the processor 801 when the processor 801 performs an operation.

In addition, the network device 800 includes some functional modules that are not shown. Details are not described herein.

Optionally, an embodiment of this application further provides a terminal device, including a processor, a memory, and a computer program stored in the memory and capable of running on the processor, where when the computer program is executed by the processor, the processes of the information transmission method in the foregoing embodiment are implemented, with the same technical effects achieved. To avoid repetition, details are not described herein again.

Optionally, an embodiment of this application further provides a network device, including a processor, a memory, and a computer program stored in the memory and capable of running on the processor, where when the computer program is executed by the processor, the processes of the information transmission method in the foregoing embodiment are implemented, with the same technical effects achieved. To avoid repetition, details are not described herein again.

An embodiment of this application further provides a computer-readable storage medium, where the computer-readable storage medium stores a computer program, and when the computer program is executed by a processor, the plurality of processes of the information transmission method in the foregoing embodiments are implemented, with the same technical effects achieved. To avoid repetition, details are not described herein again. For example, the computer-readable storage medium includes a read-only memory (ROM), a random access memory (RAM), a magnetic disk, an optical disc, or the like.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product may be stored in a storage medium (for example, a ROM/RAM, a magnetic disk, or an optical disc), and includes several instructions for instructing a terminal device (which may be a mobile phone, a computer, a server, an air conditioner, a network device, or the like) to perform the method described in a plurality of embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. An information transmission method, comprising:
receiving, by user equipment (UE), a response message to a beam failure recovery request from a network device;
determining, by the UE based on a first beam indicated in the beam failure recovery request, target beam information; and
performing, by the UE by using the target beam information, transmission of first information within a first predetermined time period; wherein
a start point of the first predetermined time period is: a time at which the UE receives the response message, or a time after a first duration following reception of the response message by the UE; and the first duration is associated with a target subcarrier spacing; and
the target subcarrier spacing comprises: a first subcarrier spacing corresponding to a first carrier on which the response message is located, and/or a second subcarrier spacing corresponding to a second carrier on which the first information is located;
wherein the method further comprises:
determining, by the UE based on the first subcarrier spacing, the first duration; or
determining, by the UE based on the second subcarrier spacing, the first duration;
wherein the determining, by the UE based on the first subcarrier spacing, the first duration comprises: in a case that the first carrier is on a frequency range 2 (FR2) band and that the second carrier is on a frequency range 1 (FR1) band, determining, by the UE based on the first subcarrier spacing, the first duration; or in a case that both the first carrier and the second carrier are on the FR2 band, determining, by the UE based on the first subcarrier spacing, the first duration;
wherein the determining, by the UE based on the second subcarrier spacing, the first duration comprises: in a case that the first carrier is on an FR1 band and that the second carrier is on an FR2 band, determining, by the UE based on the second subcarrier spacing, the first duration; or in a case that both the first carrier and the second carrier are on the FR2 band, determining, by the UE based on the second subcarrier spacing, the first duration.

2. The method according to claim 1, wherein the receiving, by UE, a response message to a beam failure recovery request from a network device comprises:
in a case that a first cell is on an FR2 band and that the first cell is a cell other than a secondary cell with a beam failure, determining, by the UE based on transmission configuration indicator (TCI) state information of a downlink channel in which the response message is located, a second beam, and using, by the UE, the second beam to receive the response message from the network device;
or,
in a case that the first cell is a secondary cell with a beam failure, using, by the UE, the first beam to receive the response message from the network device; wherein
the first cell is a cell where the response message is transmitted.

3. The method according to claim 1, wherein an end point of the first predetermined time period is: a time at which the UE receives second information configured or reconfigured by the network device by using radio resource control (RRC) signaling, or a time at which the UE receives second information activated by the network device by using a medium access control control element (MAC CE) command, or a time at which the UE receives second information indicated by the network device by using downlink control information (DCI) signaling, or a time after the UE transmits feedback information of second information to the network device; wherein
the second information is transmission configuration indicator (TCI) state information or spatial relation information of the first information.

4. The method according to claim 1, wherein the first information comprises at least one of the following: a physical downlink control channel (PDCCH) on a control resource set (CORESET), a physical downlink shared channel (PDSCH), a physical uplink control channel (PUCCH), a physical uplink shared channel (PUSCH), a channel state information reference signal (CSI-RS), or a sounding reference signal (SRS).

5. The method according to claim 4, wherein the CSI-RS is used for beam failure detection or CSI measurement; or a higher-layer parameter usage of a resource set to which an SRS resource of the SRS belongs is set to codebook or non codebook or antenna switching.

6. The method according to claim 1, wherein the transmission of the first information is performed in at least one of the following:
a secondary cell with a beam failure;
all cells in a cell group to which a secondary cell with a beam failure belongs; or
all cells in a band in which a secondary cell with a beam failure is located.

7. User equipment (UE), comprising a processor, a memory, and a computer program stored in the memory and capable of running on the processor, wherein when the computer program is executed by the processor, following steps are implemented:
receiving, by the UE, a response message to a beam failure recovery request from a network device;
determining, by the UE based on a first beam indicated in the beam failure recovery request, target beam information; and
performing, by the UE by using the target beam information, transmission of first information within a first predetermined time period; wherein
a start point of the first predetermined time period is: a time at which the UE receives the response message, or a time after a first duration following reception of the response message by the UE; and the first duration is associated with a target subcarrier spacing; and
the target subcarrier spacing comprises: a first subcarrier spacing corresponding to a first carrier on which the response message is located, and/or a second subcarrier spacing corresponding to a second carrier on which the first information is located;
wherein when the computer program is executed by the processor, following step is further implemented:
determining, by the UE based on the first subcarrier spacing, the first duration; or
determining, by the UE based on the second subcarrier spacing, the first duration;
wherein the determining, by the UE based on the first subcarrier spacing, the first duration comprises: in a case that the first carrier is on a frequency range 2 (FR2) band and that the second carrier is on a frequency range 1 (FR1) band, determining, by the UE based on the first subcarrier spacing, the first duration; or in a case that both the first carrier and the second carrier are on the FR2 band, determining, by the UE based on the first subcarrier spacing, the first duration;

wherein the determining, by the UE based on the second subcarrier spacing, the first duration comprises: in a case that the first carrier is on an FR1 band and that the second carrier is on an FR2 band, determining, by the UE based on the second subcarrier spacing, the first duration; or in a case that both the first carrier and the second carrier are on the FR2 band, determining, by the UE based on the second subcarrier spacing, the first duration.

8. The UE according to claim 7, wherein the receiving, by the UE, a response message to a beam failure recovery request from a network device comprises:

in a case that a first cell is on an FR2 band and that the first cell is a cell other than a secondary cell with a beam failure, determining, by the UE based on transmission configuration indicator (TCI) state information of a downlink channel in which the response message is located, a second beam, and using, by the UE, the second beam to receive the response message from the network device;

or, in a case that the first cell is a secondary cell with a beam failure, using, by the UE, the first beam to receive the response message from the network device; wherein the first cell is a cell where the response message is transmitted.

9. The UE according to claim 7, wherein the first information comprises at least one of the following: a physical downlink control channel (PDCCH) on a control resource set (CORESET), a physical downlink shared channel (PDSCH), a physical uplink control channel (PUCCH), a physical uplink shared channel (PUSCH), a channel state information reference signal (CSI-RS), or a sounding reference signal (SRS).

10. The UE according to claim 7, wherein the transmission of the first information is performed in at least one of the following:

a secondary cell with a beam failure;

all cells in a cell group to which a secondary cell with a beam failure belongs; or all cells in a band in which a secondary cell with a beam failure is located.

11. A network device, comprising a processor, a memory, and a computer program stored in the memory and capable of running on the processor, wherein when the computer program is executed by the processor, following steps are implemented:

transmitting, by the network device, a response message to a beam failure recovery request to UE;

determining, by the network device based on a first beam indicated in the beam failure recovery request, target beam information; and performing, by the network device by using the target beam information, transmission of first information within a second predetermined time period; wherein a start point of the second predetermined time period is: a time at which the network device transmits the response message, or a time after a second duration following transmission of the response message by the network device; and the second duration is associated with a target subcarrier spacing; and the target subcarrier spacing comprises: a subcarrier spacing corresponding to a first carrier on which the response message is located, and/or a subcarrier spacing corresponding to a second carrier on which the first information is located;

wherein when the computer program is executed by the processor, following step is further implemented:

determining, by the network device based on the first subcarrier spacing, the second duration; or determining, by the network device based on the second subcarrier spacing, the second duration;

wherein the determining, by the network device based on the first subcarrier spacing, the second duration comprises: in a case that the first carrier is on a frequency range 2 (FR2) band and that the second carrier is on a frequency range 1 (FR1) band, determining, by the network device based on the first subcarrier spacing, the second duration; or in a case that both the first carrier and the second carrier are on the FR2 band, determining, by the network device based on the first subcarrier spacing, the second duration;

wherein the determining, by the network device based on the second subcarrier spacing, the second duration comprises: in a case that the first carrier is on an FR1 band and that the second carrier is on an FR2 band, determining, by the network device based on the second subcarrier spacing, the second duration; or in a case that both the first carrier and the second carrier are on the FR2 band, determining, by the network device based on the second subcarrier spacing, the second duration.

12. The network device according to claim 11, wherein the transmitting, by the network device, a response message to a beam failure recovery request to UE comprises:

in a case that a first cell is on an FR2 band and that the first cell is a cell other than a secondary cell with a beam failure, determining, by the network device based on transmission configuration indicator (TCI) state information used by a downlink channel in which the response message is located, a second beam, and using, by the UE, the second beam to transmit the response message to the UE;

or, in a case that the first cell is a secondary cell with a beam failure, using, by the network device, the first beam to transmit the response message to the UE; wherein the first cell is a cell where the response message is transmitted.

13. The network device according to claim 11, wherein an end point of the second predetermined time period is: a time at which the network device transmits radio resource control (RRC) signaling for configuring or reconfiguring second information, or a time at which the network device transmits a MAC CE command for activating the second information, or a time at which the network device transmits DCI signaling for indicating the second information, or a time after the network device receives feedback information of the second information transmitted by the UE; wherein the second information is TCI state information or spatial relation information of the first information.

14. The network device according to claim 11, wherein the first information comprises at least one of the following: a PDCCH on a CORESET, a PDSCH, a PUCCH, a PUSCH, a CSI-RS, or an SRS.

15. The network device according to claim 11, wherein the transmission of the first information is performed in at least one of the following:
- a secondary cell with a beam failure;
- all cells in a cell group to which a secondary cell with a beam failure belongs; or
- all cells in a band in which a secondary cell with a beam failure is located.

* * * * *